(12) United States Patent
Yan et al.

(10) Patent No.: US 12,501,095 B2
(45) Date of Patent: Dec. 16, 2025

(54) ADAPTIVE PLAYBACK METHOD AND DEVICE FOR VIDEO

(71) Applicant: Beijing Zitiao Network Technology Co., Ltd., Beijing (CN)

(72) Inventors: Bing Yan, Beijing (CN); Xigui Wang, Beijing (CN); Hui Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 164 days.

(21) Appl. No.: 18/263,683

(22) PCT Filed: Feb. 21, 2022

(86) PCT No.: PCT/CN2022/077148
§ 371 (c)(1),
(2) Date: Jul. 31, 2023

(87) PCT Pub. No.: WO2022/183922
PCT Pub. Date: Sep. 9, 2022

(65) Prior Publication Data
US 2024/0121460 A1    Apr. 11, 2024

(30) Foreign Application Priority Data
Mar. 4, 2021    (CN) .......................... 202110242073.1

(51) Int. Cl.
*H04N 21/2662*    (2011.01)
*H04N 21/24*    (2011.01)
*H04N 21/472*    (2011.01)

(52) U.S. Cl.
CPC ..... *H04N 21/2662* (2013.01); *H04N 21/2402* (2013.01); *H04N 21/47217* (2013.01)

(58) Field of Classification Search
CPC ........... H04N 21/239; H04N 21/47217; H04N 21/2402; H04N 21/472; H04N 21/2662; H04N 21/44209
See application file for complete search history.

(56) References Cited

U.S. PATENT DOCUMENTS

2015/0358686 A1    12/2015    Xu et al.
2016/0337680 A1    11/2016    Kalagi et al.

FOREIGN PATENT DOCUMENTS

CN    103002272 A    *    3/2013
CN    103260053 A        8/2013
(Continued)

OTHER PUBLICATIONS

China National Intellectual Property Administration, International Search Report and Written Opinion Issued in Application No. PCT/CN2022/077148, May 26, 2022, WIPO, 13 pages.
(Continued)

*Primary Examiner* — Ngoc K Vu
(74) *Attorney, Agent, or Firm* — Alleman Hall & Tuttle LLP

(57) ABSTRACT

Embodiments of the present disclosure provide an adaptive playback method and device for video, the method includes: receiving a playback instruction for a target video; and playing the target video according to a first code rate in response to the playback instruction; where the first code rate is determined by the following steps: predicting by using a network speed prediction algorithm to obtain a first network speed; acquiring a code rate prediction model corresponding to the network speed prediction algorithm, where the code rate prediction model is used for representing, under a historical performance parameter before switching to the network speed prediction algorithm, a mapping relationship between a network speed predicted by the network speed prediction algorithm and a code rate; and
(Continued)

determining the first code rate corresponding to the first network speed through the code rate prediction model.

17 Claims, 4 Drawing Sheets

(56) References Cited

FOREIGN PATENT DOCUMENTS

| | | | | |
|---|---|---|---|---|
| CN | 105163137 A | | 12/2015 | |
| CN | 106993237 A | | 7/2017 | |
| CN | 108063961 A | | 5/2018 | |
| CN | 109982118 A | | 7/2019 | |
| CN | 111405327 A | | 7/2020 | |
| CN | 111510771 A | | 8/2020 | |
| CN | 111757181 A | | 10/2020 | |
| CN | 112019873 A | * | 12/2020 | ......... H04N 21/2187 |
| CN | 112019916 A | * | 12/2020 | ........... H04N 21/438 |
| CN | 112383823 A | | 2/2021 | |
| WO | 2020015678 A1 | | 1/2020 | |

OTHER PUBLICATIONS

China National Intellectual Property Administration, Office Action and Search Report Issued in Application No. 202110242073.1, Jan. 20, 2023, 9 pages. Submitted with partial English translation.
China National Intellectual Property Administration, Notice of Grant Issued in Application No. 202110242073.1, May 9, 2023, 4 pages.

* cited by examiner

ADAPTIVE PLAYBACK METHOD AND DEVICE FOR VIDEO

CROSS-REFERENCE TO RELATED APPLICATIONS

This application is a National Stage of International Application No. PCT/CN2022/077148, filed on Feb. 21, 2022, which claims priority to Chinese Patent Application No. 202110242073.1, filed on Mar. 4, 2021, both of which are hereby incorporated by reference in their entireties.

TECHNICAL FIELD

Embodiments of the present disclosure relate to the technical field of video processing, in particular to an adaptive playback method and device for video.

BACKGROUND

With the increasingly powerful function of terminal device, people have increasingly extensive use for the terminal device. People can play a video online in the process of using the terminal device, and a code rate (also referred to as definition) of the video when the video is played online directly affects the effect of video playback. In general, the greater the code rate, the better the effect of the video playback is. The video may be played at a code rate of the video selected by the user or adaptively before the video is played online.

In the above adaptive playback process for video, how to ensure the video playback performance is an urgent problem to be solved.

SUMMARY

Embodiments of the present disclosure provide an adaptive playback method and device for video, so as to improve video playback performance.

In a first aspect, an embodiment of the present disclosure provides an adaptive playback method for video, including:
receiving a playback instruction for a target video; and
playing the target video according to a first code rate in response to the playback instruction;
where the first code rate is determined by the following steps:
predicting by using a network speed prediction algorithm to obtain a first network speed;
acquiring a code rate prediction model corresponding to the network speed prediction algorithm, where the code rate prediction model is used for representing, under a historical performance parameter before switching to the network speed prediction algorithm, a mapping relationship between a network speed predicted by the network speed prediction algorithm and a code rate; and
determining the first code rate corresponding to the first network speed through the code rate prediction model.

In a second aspect, an embodiment of the present disclosure provides a method for generating a code rate prediction model, including:
acquiring at least two video playback records, where the video playback records include a second code rate when a video is played, a second network speed when the video is played predicted by using a network speed prediction algorithm, and at least one playback parameter of the video;
for at least one network speed interval, determining a performance parameter corresponding to the second code rate under each network speed interval according to a playback parameter in at least one target video playback record, where the second network speed in the target video playback record is within the network speed interval;
determining, according to the performance parameter corresponding to the second code rate under each network speed interval, a second code rate corresponding to each network speed interval under a historical performance parameter before switching to the network speed prediction algorithm; and
determining a code rate prediction model corresponding to the network speed prediction algorithm according to the at least one network speed interval and the second code rate respectively corresponding to the at least one network speed interval, where the code rate prediction model is used for representing a mapping relationship between a network speed predicted by the network speed prediction algorithm and a code rate under the historical performance parameter.

In a third aspect, an embodiment of the present disclosure provides a terminal device, including:
a playback instruction receiving module, configured to receive a playback instruction for a target video; and
a target video playback module, configured to play the target video according to a first code rate in response to the playback instruction;
where the first code rate is determined by the following modules:
a network speed prediction module, configured to predict by using a network speed prediction algorithm to obtain a first network speed;
a code rate prediction model acquisition module, configured to acquire a code rate prediction model corresponding to the network speed prediction algorithm, where the code rate prediction model is used for representing, under a historical performance parameter before switching to the network speed prediction algorithm, a mapping relationship between a network speed predicted by the network speed prediction algorithm and a code rate; and
a first code rate determination module, configured to determine the first code rate corresponding to the first network speed through the code rate prediction model.

In a fourth aspect, an embodiment of the present disclosure provides a server, including:
a video playback record acquisition module, configured to acquire at least two video playback records, where the video playback records include a second code rate when a video is played, a second network speed when the video is played predicted by using a network speed prediction algorithm, and at least one playback parameter of the video;
a performance parameter determination module, configured to, for at least one network speed interval, determine a performance parameter corresponding to the second code rate under each network speed interval according to a playback parameter in at least one target video playback record, where the second network speed in the target video playback record is within the network speed interval;
a second code rate determination module, configured to determine, according to the performance parameter corresponding to the second code rate under each network speed interval, a second code rate corresponding to each network speed interval under a historical performance parameter before switching to the network speed prediction algorithm; and a code rate prediction model determination module, configured to determine a code rate prediction model corresponding to the network speed prediction algorithm according to the at least one network speed interval and the second code rate respectively corresponding to the at least one network speed interval, where the code rate prediction model is used for representing a mapping relationship between a network speed predicted by the network speed prediction algorithm and a code rate under the historical performance parameter.

In a fifth aspect, an embodiment of the present disclosure provides a terminal device, including at least one processor and a memory;

the memory stores computer-executable instructions; and
the at least one processor executes the computer-executable instructions stored in the memory, so that the terminal device implements the method according to the first aspect.

In a sixth aspect, an embodiment of the present disclosure provides a server, including at least one processor and a memory;

the memory stores computer-executable instructions; and
the at least one processor executes the computer-executable instructions stored in the memory, so that the server implements the method according to the second aspect.

In a seventh aspect, an embodiment of the present disclosure provides an adaptive playback system for video, including: the terminal device according to the third aspect or the fifth aspect, and the server according to the fourth aspect or the sixth aspect.

In an eighth aspect, an embodiment of the present disclosure provides a computer-readable storage medium, where the computer readable storage medium stores computer executable instructions, and when a processor executes the computer executable instructions, a computing device is caused to implement the method according to the first aspect or the second aspect.

In a ninth aspect, an embodiment of the present disclosure provides a computer program, the computer program is used for implementing the method according to the first aspect or the second aspect.

In a tenth aspect, a computer program product includes a computer program which, when executed by a processor, implements the method according to the first aspect or the second aspect.

In the adaptive playback method and device for video provided by the embodiments, the method includes: receiving a playback instruction for a target video; and playing the target video according to a first code rate in response to the playback instruction; where the first code rate is determined by the following steps: predicting by using a network speed prediction algorithm to obtain a first network speed; acquiring a code rate prediction model corresponding to the network speed prediction algorithm, where the code rate prediction model is used for representing, under a historical performance parameter before switching to the network speed prediction algorithm, a mapping relationship between a network speed predicted by the network speed prediction algorithm and a code rate; and determining the first code rate corresponding to the first network speed through the code rate prediction model. According to the embodiments of the present disclosure, different code rate prediction models may be adopted for different network speed prediction algorithms, so as to ensure that performance parameters after switching the network speed prediction algorithm are consistent with historical performance parameters before switching, which is helpful to prevent the video playback performance from becoming poor after switching the network speed prediction algorithm.

BRIEF DESCRIPTION OF DRAWINGS

In order to illustrate technical solutions in embodiments of the present disclosure or the prior art more clearly, accompanying drawings that need to be used in description of the embodiments or the prior art will be briefly introduced below. It is obvious that the accompanying drawings in the following description are some embodiments of the present disclosure, and for those of ordinary skill in the art, other accompanying drawings may also be acquired according to these accompanying drawings without paying any creative efforts.

DESCRIPTION OF EMBODIMENTS

In order to make objectives, technical solutions and advantages of the embodiments of the present disclosure clearer, the technical solutions in the embodiments of the present disclosure will be clearly and completely described below with reference to the accompanying drawings in the embodiments of the present disclosure. It is clear that, the described embodiments are some embodiments of the present disclosure, rather than all embodiments. All other embodiments obtained by a person of ordinary skill in the art based on the embodiments of the present disclosure without paying creative efforts shall fall within the protection scope of the present disclosure.

Figure 1:
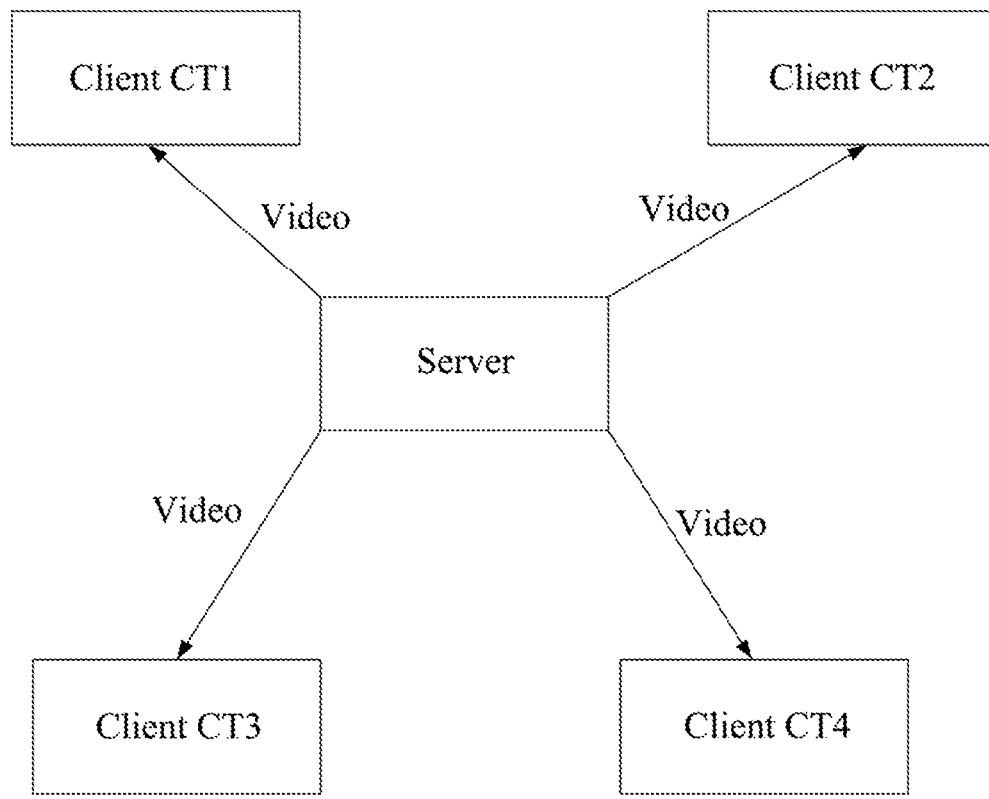
FIG. 1 exemplarily illustrates an online video playback scenario provided by an embodiment of the present disclosure.

Embodiments of the present disclosure may be applied to an online video playback scenario. A video is stored in a server, and one or more clients may access the server to acquire the video from the server, and the acquired video may be played on the client. FIG. 1 exemplarily illustrates an online video playback scenario provided by an embodiment of the present disclosure. FIG. 1 exemplarily shows one server and four clients CT1 (client1), CT2 (client2), CT3 (client3) and CT4 (client4), and CT1, CT2, CT3 and CT4 are applications installed in different terminal devices. When a video logo on the client is clicked, the client obtains a video from the server to play. For example, when a video logo on CT1 is clicked, CT1 obtains a video from the server. Of course, at least two clients in CT1, CT2, CT3 and CT4 in FIG. 1 may obtain the same video or different videos from the server at the same time, or may obtain the same video or different videos from the server at different times.

In the above online video playback scenario, the video may be played at a code rate of the video selected by a user or adaptively before the video is played online. After the user selects the code rate of the video, the client loads the video from the server at the code rate, and plays the loaded video. After the user selects adaptive playback, the terminal device may perform the following main steps: first, predicting a network speed of the terminal device; then, determining a target code rate corresponding to the network speed according to a preset code rate prediction model; and finally, loading the video at the target code rate and playing it. The code rate prediction model is used for representing a correspondence between a network speed and a target code rate.

It can be seen that in the adaptive playback process, the preset code rate prediction models adopted for different network speed prediction algorithms are the same. However, in practical application, the network speed prediction algorithms have the problem of different accuracy, resulting in different network speed prediction algorithms predicting different network speeds for the same terminal device at the same time. In this way, the predicted network speeds before and after switching the network speed prediction algorithm at a certain moment may be different. However, the real network speed of the terminal device is generally relatively stable within a period of time, and when the predicted network speed before switching is lower than the real network speed and the predicted network speed after switching is higher than the real network speed, adopting the same code rate prediction model will lead to the target code rate determined before the switching being lower than the target code rate determined after the switching. In this way, there will be the following situations: the real network speed may support the target code rate determined before the switching, but cannot support the target code rate determined after the switching, which leads to that video playback lag when video playback is performed according to the target code rate after the switching, and the video playback performance becomes poor after switching the network speed prediction algorithm.

In order to solve the above technical problems, different code rate prediction models may be adopted for different network speed prediction algorithms, so as to ensure the consistency of performance parameters such as lag parameters before and after switching the network speed prediction algorithm, which may reduce the video playback lag after the switching, and help to prevent the video playback performance from becoming poor after the switching.

In the embodiments of the present disclosure, a video playback record after switching the network speed prediction algorithm is obtained at a server side, and a performance parameter corresponding to a second code rate when playing video under each network speed interval is determined from the video playback record, so as to determine the second code rate corresponding to the network speed interval under historical performance parameters, and a code rate prediction model corresponding to the switched network speed prediction algorithm is determined based on the second code rate and the network speed interval.

At the terminal device side, the code rate prediction model corresponding to the network speed prediction algorithm is adopted to determine a first code rate corresponding to a first network speed predicted by the network speed prediction algorithm, so as to play the target video according to the first code rate.

It can be seen that the embodiments of the present disclosure adopts the corresponding code rate prediction model for each network speed prediction algorithm to perform adaptive playback, and the code rate prediction algorithm is determined based on the historical performance parameters, which may ensure that the performance parameters after switching the network speed prediction algorithm are consistent with the historical performance parameters before the switching, reduce the video playback lag after the switching, and help to prevent the video playback performance from becoming poor after switching the network speed prediction algorithm.

The technical solution of the embodiments of the present disclosure and how the technical solution of the present disclosure solves the above technical problems will be described in detail with specific embodiments. The following specific embodiments may be combined with each other, and the same or similar concepts or processes may not be repeated in some embodiments. The embodiments of the present disclosure will be described below with reference to the accompanying drawings.

Figure 2:
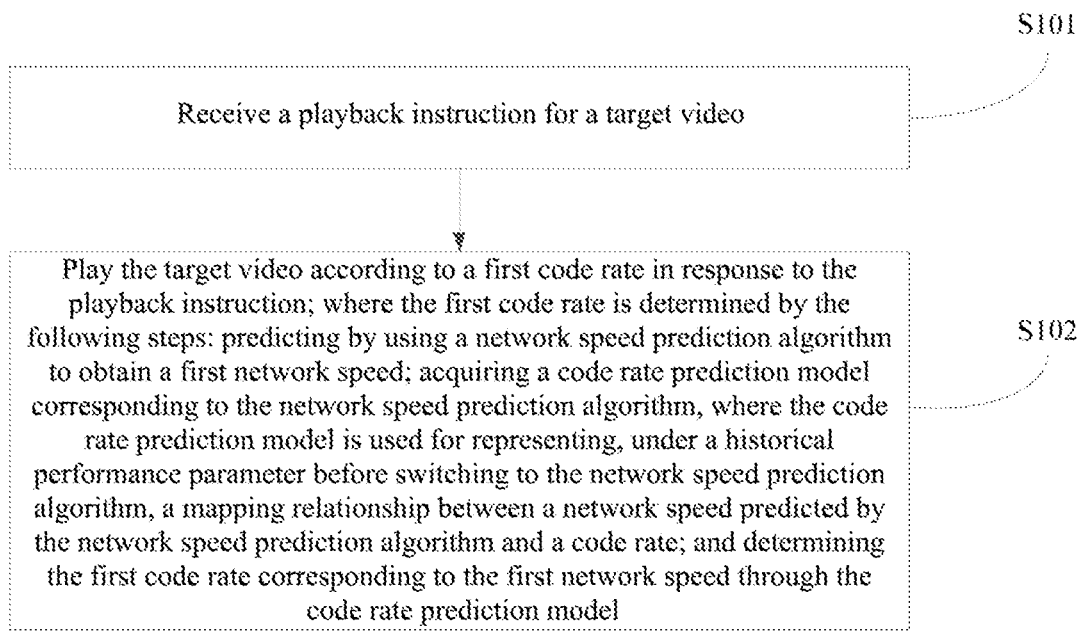
FIG. 2 exemplarily illustrates a flowchart of steps of an adaptive playback method for video provided by an embodiment of the present disclosure.

FIG. 2 exemplarily illustrates a flowchart of steps of an adaptive playback method for video provided by an embodiment of the present disclosure. The method shown in FIG. 2 may be applied to a terminal device. Referring to FIG. 2, the adaptive playback method for the video includes:

S101: receive a playback instruction for a target video.

The playback instruction is performed by a user on a client running on the terminal device, and the target video is any video provided by the server in FIG. 1.

S102: play the target video according to a first code rate in response to the playback instruction; where the first code rate is determined by the following steps: predicting by using a network speed prediction algorithm to obtain a first network speed; acquiring a code rate prediction model corresponding to the network speed prediction algorithm, where the code rate prediction model is used for representing, under a historical performance parameter before switching to the network speed prediction algorithm, a mapping relationship between a network speed predicted by the network speed prediction algorithm and a code rate; and determining the first code rate corresponding to the first network speed through the code rate prediction model.

The network speed prediction algorithm may predict the first network speed of the current time based on real network speeds of at least two historical times, and the first network speed is a predicted network speed of the terminal device at the current time. The network speed prediction algorithm may be any existing network speed prediction algorithm. The commonly used network speed prediction algorithm may be a moving average (MA) algorithm, a 9alman filter (KF) algorithm and a prediction algorithm based on a deep learning model.

Specifically, when acquiring the code rate prediction model corresponding to the network speed prediction algorithm, if the code rate prediction model corresponding to the network speed prediction algorithm exists locally in the terminal device, it means that the terminal device has played any video in the server to which the target video belongs before the current time. At this time, the code rate prediction model corresponding to the network speed prediction algorithm may be directly acquired from the terminal device locally. If the code rate prediction model corresponding to the network speed prediction algorithm does not exist locally in the terminal device, it means that the terminal device has not played any video in the server to which the target video belongs before the current time. At this time, the terminal device may acquire the code rate prediction model corresponding to the network speed prediction algorithm from the server and store the code rate prediction model locally in the terminal device, so that when the terminal device plays any video on the server again, the code rate prediction model corresponding to the network speed prediction algorithm may be locally acquired from the terminal device.

In an implementation, the acquiring the code rate prediction model corresponding to the network speed prediction algorithm from the server includes: firstly, sending a model acquisition request to the server providing the target video, where the model acquisition request is used for acquiring the code rate prediction model corresponding to the network speed prediction algorithm; then, receiving the code rate prediction model sent by the server.

The model acquisition request may carry an identification of the network speed prediction algorithm. The server may generate the code rate prediction model corresponding to the network speed prediction algorithm offline after the network speed prediction algorithm is switched, and send it to the terminal device after receiving the model acquisition request sent by the terminal device. The server may also generate the code rate prediction model corresponding to the network speed prediction algorithm after receiving a model acquisition request sent to any terminal device, and send it to that terminal device.

The detailed description of generating the code rate prediction model by the server may refer to S201 to S204.

After the code rate prediction model is obtained, the first network speed may be input into the code rate prediction model to obtain the first code rate, the first code rate is a code rate determined by the code rate prediction model according to the first network speed.

After the first code rate is obtained, the target video may be loaded from the server according to the first code rate, and the target video starts to be played after part or all of the target video is loaded.

It may be understood that the first code rate may be one of preset code rates or not. The preset code rate is one or more code rates allowed by adaptive playback, that is, the terminal device may only load the target video from the server at one of the preset code rates.

In an implementation, when the first code rate is not the preset code rate, the playing the target video according to the first code rate includes: firstly, determining a second code rate closest to the first code rate from at least two preset code rates; and then, playing the target video according to the second code rate.

The playing the target video according to the second code rate may be: loading the target video from the server at the second code rate, and starting to play the target video after loading part or all of the target video.

In practical application, the target video may have been started to load. At this time, if a current code rate at which the target video is loaded is the second code rate, the target video is played after the target video is loaded at the second code rate. In this way, the duration of loading the target video may be reduced, thereby reducing the delay of playing the target video. If the current code rate at which the target video is loaded is different from the second code rate, total duration of loading the target video at the second code rate and remaining duration of loading the target video at the current code rate is determined; and if the remaining duration is less than or equal to the total duration, the target video is played after the target video is loaded at the current code rate; and if the remaining duration is greater than the total duration, remaining part of the target video is loaded at the second code rate, and the target video is played after the target video is loaded at the second code rate.

The code rate is the number of bits sent per unit time, so that the total duration is a ratio of the total number of bits of the target video to the second code rate, and the remaining duration is a ratio of the total number of bits of the unloaded part of the target video to the current code rate.

The embodiment of the present disclosure may select the loading mode according to the remaining duration and the total duration, so as to make the duration of loading the target video shorter and reduce the delay of playing the target video.

Figure 3:
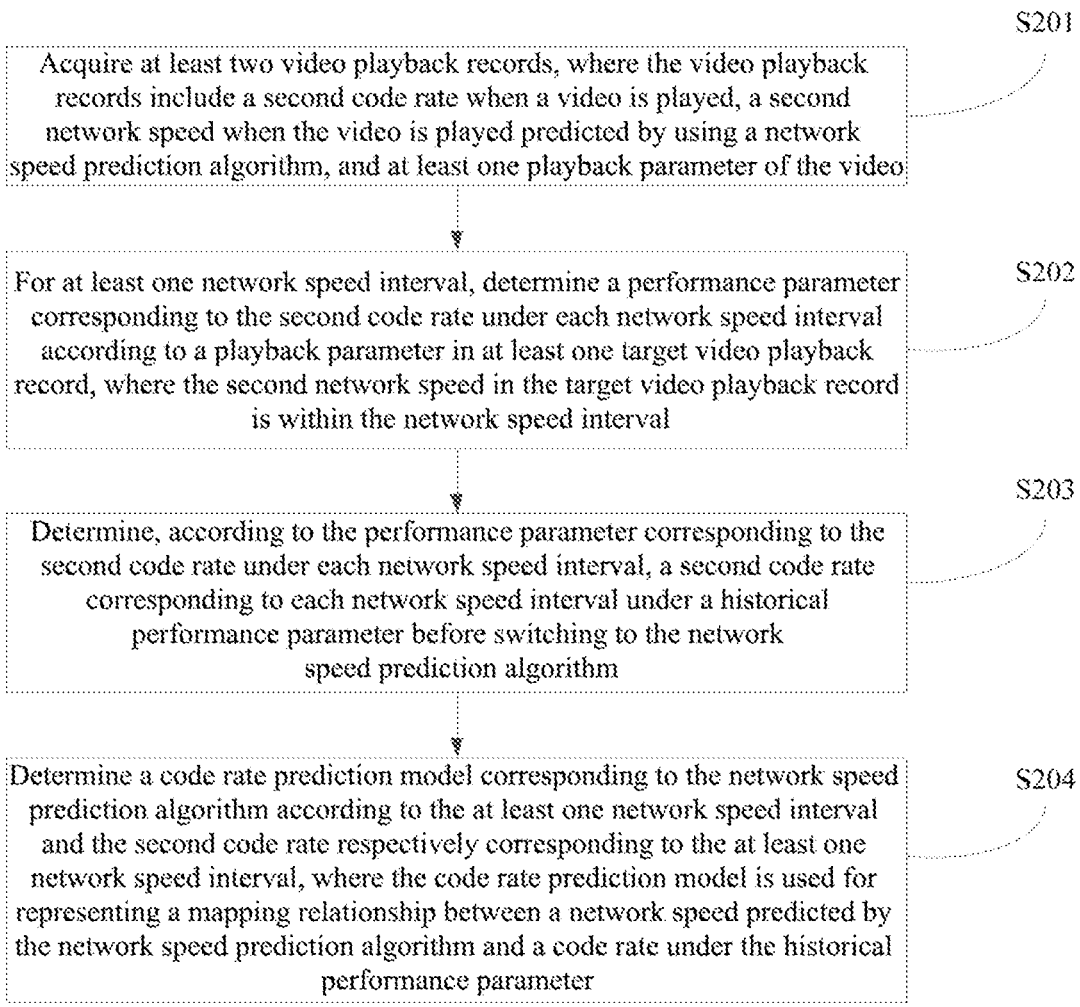
FIG. 3 exemplarily illustrates a flowchart of steps of a method for generating a code rate prediction model provided by an embodiment of the present disclosure.

FIG. 3 exemplarily illustrates a flowchart of steps of a method for generating a code rate prediction model provided by an embodiment of the present disclosure. The method shown in FIG. 3 may be applied to a server. Referring to FIG. 3, the method for generating the code rate prediction model includes:

S201: acquire at least two video playback records, where the video playback records include a second code rate when a video is played, a second network speed when the video is played predicted by using a network speed prediction algorithm, and at least one playback parameter of the video.

The video playback records may be generated after switching to the above network speed prediction algorithm. In practical application, the network speed prediction algorithm may be used to predict the network speed for some terminal devices to generate the video playback records. Based on the video playback records, the code rate prediction model corresponding to the network speed prediction algorithm is generated through S201 to S204. In this way, in the process of generating the code rate prediction model, the situation of video playback lag of a large number of terminal devices may be reduced as much as possible.

The playback parameter existing in the video playback records is a basic parameter for determining a performance parameter. For example, when the performance parameter is a lag rate, a lag rate corresponding to each video playback record is a ratio of lag duration to video duration in the video playback record, the lag duration and the video duration are playback parameters, and a lag rate corresponding to the multiple video playback records is a ratio of total lag duration to total video duration in the multiple video playback records. For another example, when the performance parameter is the number of lags, the number of lags corresponding to each video playback record is the number of lags in the video playback record, and the number of lags corresponding to the multiple video playback records is the total number of lags in multiple video playback records.

It may be understood that the second code rate is a code rate when a video is played, which is different from a code rate for playing the target video. The second network speed is a network speed predicted by the network speed prediction algorithm when the video is played, which is different from a network speed predicted when the target video is played.

S202: for at least one network speed interval, determine a performance parameter corresponding to the second code rate under each network speed interval according to a playback parameter in at least one target video playback record, where the second network speed in the target video playback record is within the network speed interval.

The network speed interval may be a sub-interval, which is obtained by dividing an interval composed of the maximum second network speed and the minimum second network speed in a large number of video playback records according to a preset length. For each network speed interval, firstly, the video playback record of the second code rate within the network speed interval is acquired to obtain at least one target video playback record corresponding to the network speed interval; then, the target video playback record is clustered according to the second code rate to obtain at least one record class cluster, where each record class cluster corresponds to one second code rate; finally, for the record class cluster corresponding to each second code rate, a performance parameter is calculated according to playback parameters in each target video playback record in the record class cluster, and the obtained performance parameter is a performance parameter corresponding to the second code rate under the network speed interval.

The above relationship between the performance parameter and the playback parameter may be described with reference to the relationship between the playback parameter and the performance parameter in S201, which is not repeated here.

After S202, the performance parameters corresponding to the multiple second code rates under several network speed intervals shown in table below are obtained.

| Network | Second code rate Performance parameter | | | | |
|---|---|---|---|---|---|
| Speed interval | B1 | B2 | B3 | B4 | B5 |
| C1 | A11 | A12 | A13 | A14 | A15 |
| C2 | A21 | A22 | A23 | A24 | A25 |
| C3 | A31 | A32 | A33 | A34 | A35 |
| C4 | A41 | A42 | A43 | A44 | A45 |

The performance parameter shown in the above table is the lag duration, the unit of which is millisecond, and the unit of the second code rate and the network speed is KBPS (kilobits per second).

It should be noted that in the above table, for the second code rate: B1<B2<B3<B4<B5, and a network speed corresponding to network speed interval C1<a network speed corresponding to C2<a network speed corresponding to C3<a network speed corresponding to C4.

For the same network speed interval, the greater the second code rate, the worse the performance represented by the corresponding performance parameter. The performance parameters are divided into a positive parameter and a negative parameter, the greater the positive parameter, the better the performance, and the greater the negative parameter, the worse the performance. For example, for the network speed interval C1, when the performance parameter is the negative parameter such as the lag duration, then A11<A12<A13<A14<A15; when the performance parameter is the positive parameter such as the playback success rate, then A11>A12>A13>A14>A15.

For the same second code rate, the greater the network speed corresponding to the network speed interval, the better the performance represented by the corresponding performance parameter. For example, when the performance parameter is the negative parameter such as the lag duration, for the second code rate B1, then A11>A12>A13>A14; when the performance parameter is the positive parameter such as the playback success rate, for the second code rate B1, then A11<A12<A13<A14.

S203: determine, according to the performance parameter corresponding to the second code rate under each network speed interval, a second code rate corresponding to each network speed interval under a historical performance parameter before switching to the network speed prediction algorithm.

The historical performance parameter may be the performance parameter counted before the network speed prediction algorithm is switched. Specifically, for each network speed interval, a second code rate corresponding to the historical performance parameter may be acquired from performance parameters corresponding to multiple second code rates under the network speed interval. For example, if a historical performance parameter is 56, for a network speed interval 0-99 in the above table, a code rate corresponding to the performance parameter 53.14 that is close to 56 is selected as the second code rate corresponding to the historical performance parameter from the performance parameters 16.99, 53.14, 116.27, 175.47 and 283.56 respectively corresponding to the respective five second code rates 50, 100, 150, 200 and 250 of the network speed interval.

It may be understood that, under the historical performance parameter, the second code rates corresponding to a large number of network speed intervals may be obtained through S203, and the second code rates corresponding to the large number of network speed intervals may be used as the basis for generating a code rate prediction model.

S204: determine a code rate prediction model corresponding to the network speed prediction algorithm according to the at least one network speed interval and the second code rate respectively corresponding to the at least one network speed interval, where the code rate prediction model is used for representing a mapping relationship between a network speed predicted by the network speed prediction algorithm and a code rate under the historical performance parameter.

Specifically, a model may be selected first, where the model may be a mathematical model or a deep learning model, and then a parameter of the model is determined through a network speed interval and a second code rate, and after the parameter of the model is determined, the model serves as the code rate prediction model.

When the model is a deep learning model, the deep learning model may be trained through the network speed interval and the second code rate. Training is usually implemented by multiple iterations, and in each iteration, firstly, any network speed within each network speed interval is input into the deep learning model to obtain a training code rate corresponding to the network speed; then, the training code rate corresponding to the network speed and the second code rate corresponding to the network speed interval to which the network speed belongs are input into a loss function to obtain a loss value; finally, it is judged whether the loss value meets a preset condition, and if the loss value does not meet the preset condition, the parameter of the deep learning model is adjusted for the next iteration; if the loss value meets the preset condition, the training is ended, and the deep learning model at this time is the rate prediction model.

The above loss function may adopt a mean square error loss function, a cross entropy loss function, etc., which are commonly used in the prior art, which is not repeated in the embodiment of the present disclosure.

According to experience, the relationship between the network speed and the second code rate conforms to a polynomial function, so that the determining a code rate prediction model corresponding to the network speed prediction algorithm according to the at least one network speed interval and the second code rate respectively corresponding to the at least one network speed interval includes:

performing polynomial fitting according to the at least one network speed interval and the second code rate respectively corresponding to the at least one network speed interval, and taking a obtained polynomial function as the code rate prediction model corresponding to the network speed prediction algorithm.

Figure 4:
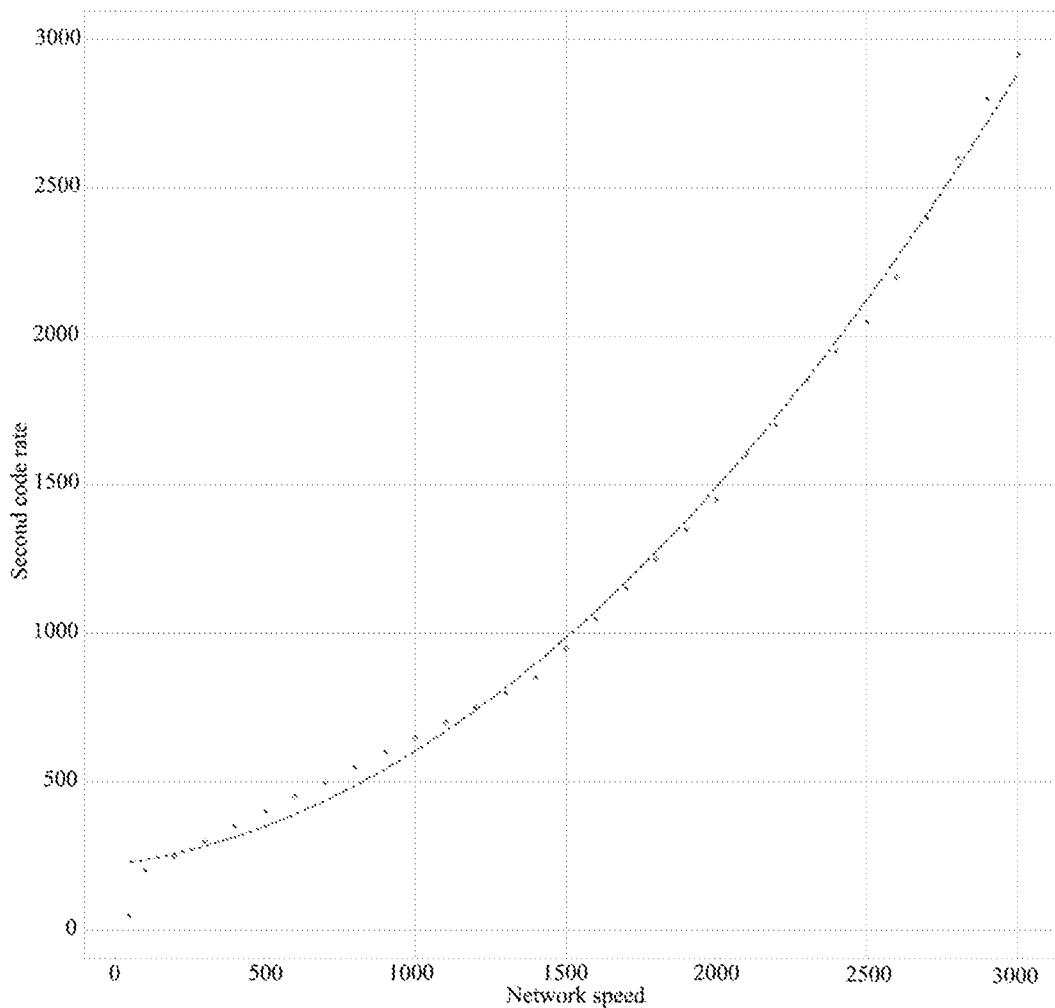
FIG. 4 exemplarily illustrates a polynomial fitted code rate prediction model provided by an embodiment of the present disclosure.

The process of polynomial fitting is the process of determining parameters of the polynomial function. FIG. 4 exemplarily illustrates a polynomial fitting code rate prediction model provided by an embodiment of the present disclosure. As shown in FIG. 4, the abscissa is the network speed and the ordinate is the second code rate. A point in FIG. 4 corresponds to a point determined by the network speed within the network speed interval and the corresponding second code rate, and a curve in FIG. 4 is a curve of the code rate prediction model obtained by performing polynomial fitting according to the point.

Because the relationship between the network speed and the second code rate conforms to the polynomial function, the accuracy of the code rate prediction model may be improved by using the polynomial function as the code rate prediction model. In addition, the complexity of polynomial fitting is lower than the training complexity of deep learning model.

In an implementation, after determining the code rate prediction model, the method further includes:

receiving a model acquisition request, where the model acquisition request is used for acquiring the code rate prediction model corresponding to the network speed prediction algorithm; in response to the model acquisition request, sending the code rate prediction model corresponding to the network speed prediction algorithm.

The model acquisition request is sent by the terminal device to the server, and carries an identification of the network speed prediction algorithm, and is used for acquiring the code rate prediction model corresponding to the identification from the server.

After receiving the model acquisition request, the server may send the code rate prediction model corresponding to the network speed prediction algorithm generated in advance offline to the terminal device; or, the server may generates the code rate prediction model corresponding to the network speed prediction algorithm according to S201 to S204, and sends it to the terminal device.

Figure 5:
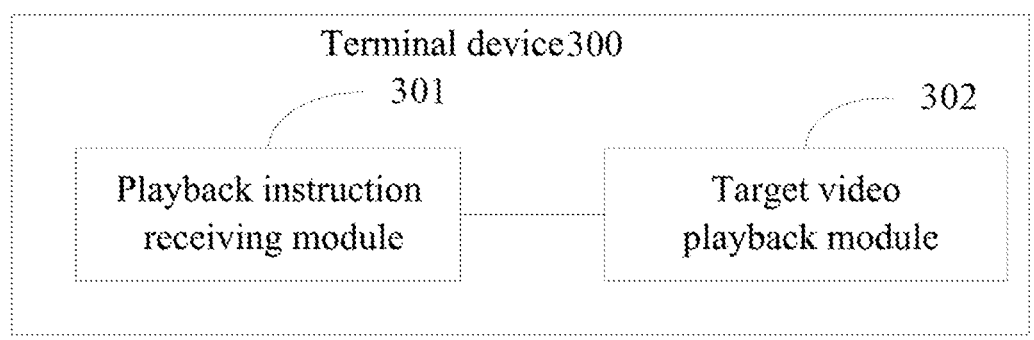
FIG. 5 exemplarily illustrates a structural schematic diagram of a terminal device provided by an embodiment of the present disclosure.

Corresponding to the adaptive playback method for video of the above embodiments, FIG. 5 exemplarily illustrates a structural schematic diagram of a terminal device provided by an embodiment of the present disclosure. For ease of description, only a part related to the embodiments of the present disclosure is shown. Referring to FIG. 5, the terminal device 300 includes a playback instruction receiving module 301 and a target video playback module 302.

The playback instruction receiving module 301 is configured to receive a playback instruction for a target video.

The target video playback module 302 is configured to play the target video according to a first code rate in response to the playback instruction; where the first code rate is determined by the following modules: a network speed prediction module, configured to predict by using a network speed prediction algorithm to obtain a first network speed; a code rate prediction model acquisition module, configured to acquire a code rate prediction model corresponding to the network speed prediction algorithm, where the code rate prediction model is used for representing, under a historical performance parameter before switching to the network speed prediction algorithm, a mapping relationship between a network speed predicted by the network speed prediction algorithm and a code rate; and a first code rate determination module, configured to determine the first code rate corresponding to the first network speed through the code rate prediction model.

In an implementation, the target video playback module 302 is further configured to:

determine a second code rate closest to the first code rate from at least two preset code rates; and play the target video according to the second code rate.

In an implementation, the target video playback module 302 is further configured to:

if the target video has been started to load, and a current code rate at which the target video is loaded is the second code rate, play the target video after the target video is loaded at the second code rate.

In an implementation, the target video playback module 302 is further configured to:

if the target video has been started to load, and a current code rate at which the target video is loaded is different from the second code rate, determine total duration of loading the target video at the second code rate and remaining duration of loading the target video at the current code rate; and if the remaining duration is less than or equal to the total duration, play the target video after the target video is loaded at the current code rate.

In an implementation, the target video playback module 302 is further configured to:

if the target video has been started to load, and a current code rate at which the target video is loaded is different from the second code rate, determine total duration of loading the target video at the second code rate and remaining duration of loading the target video at the current code rate;

if the remaining duration is greater than the total duration, load remaining part of the target video at the second code rate; and play the target video after the target video is loaded at the second code rate.

The terminal device provided by the embodiment may be used for implementing the technical solution of the above-mentioned method embodiments shown in FIG. 2, the implementation principles and technical effects thereof are similar, which are not repeated here.

Figure 6:
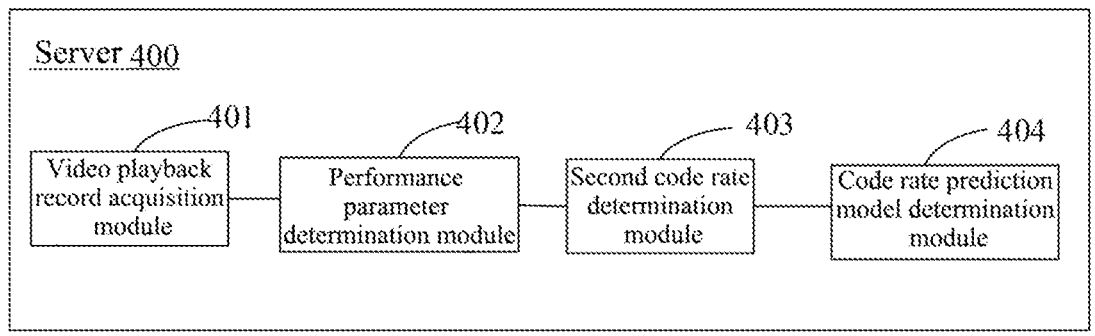
FIG. 6 exemplarily illustrates a structural diagram of a server provided by an embodiment of the present disclosure.

Corresponding to the method for generating the code rate prediction model of the above embodiments, FIG. 6 exemplarily illustrates a structural diagram of a server provided by an embodiment of the present disclosure. For ease of description, only a part related to the embodiments of the present disclosure is shown. Referring to FIG. 6, the server 400 includes a video playback record acquisition module 401, a performance parameter determination module 402, a second code rate determination module 403 and a code rate prediction model determination module 404.

The video playback record acquisition module 401 is configured to acquire at least two video playback records, where the video playback records include a second code rate when a video is played, a second network speed when the video is played predicted by using a network speed prediction algorithm, and at least one playback parameter of the video.

The performance parameter determination module 402 is configured to, for at least one network speed interval, determine a performance parameter corresponding to the second code rate under each network speed interval according to a playback parameter in at least one target video playback record, where the second network speed in the target video playback record is within the network speed interval.

The second code rate determination module 403 is configured to determine, according to the performance parameter corresponding to the second code rate under each network speed interval, a second code rate corresponding to each network speed interval under a historical performance parameter before switching to the network speed prediction algorithm.

The code rate prediction model determination module 404 is configured to determine a code rate prediction model corresponding to the network speed prediction algorithm according to the at least one network speed interval and the second code rate respectively corresponding to the at least one network speed interval, where the code rate prediction model is used for representing a mapping relationship between a network speed predicted by the network speed prediction algorithm and a code rate under the historical performance parameter.

In an implementation, the code rate prediction model determination module 404 is further configured to:
perform polynomial fitting according to the at least one network speed interval and the second code rate respectively corresponding to the at least one network speed interval, and take a obtained polynomial function as the code rate prediction model corresponding to the network speed prediction algorithm.

The server provided by the embodiment may be used for implementing the technical solution of the above-mentioned method embodiments shown in FIG. 3, the implementation principles and technical effects thereof are similar, which are not repeated here.

Figure 7:
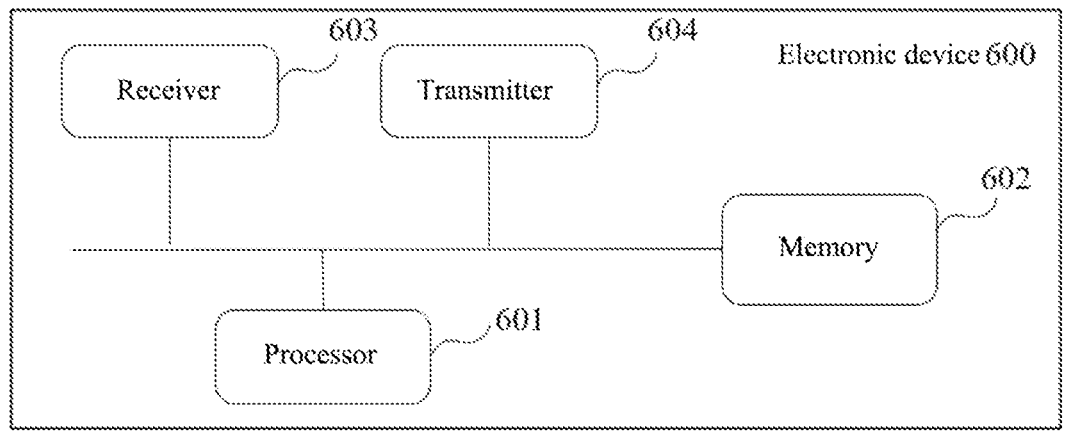
FIG. 7 exemplarily illustrates a structural block diagram of an electronic device provided by an embodiment of the present disclosure.

The above-mentioned terminal device and server are both electronic devices. FIG. 7 exemplarily illustrates a structural block diagram of an electronic device 600 provided by an embodiment of the present disclosure. The electronic device 600 includes a memory 602 and at least one processor 601;
where the memory 602 stores computer-executable instructions;
when the electronic device 600 is a terminal device, the at least one processor 601 executes the computer-executable instructions stored in the memory 602, so that the terminal device implements the adaptive playback method for video in FIG. 2;
when the electronic device 600 is a server, the at least one processor 601 executes the computer-executable instructions stored in the memory 602, so that the server implements the method for generating the code rate prediction model in FIG. 3;
in addition, the electronic device may also include a receiver 603 and a transmitter 604, the receiver 603 is used for receiving information from other devices or devices and the transmitter 604 is used for transmitting the information to other devices or devices.

Figure 8:
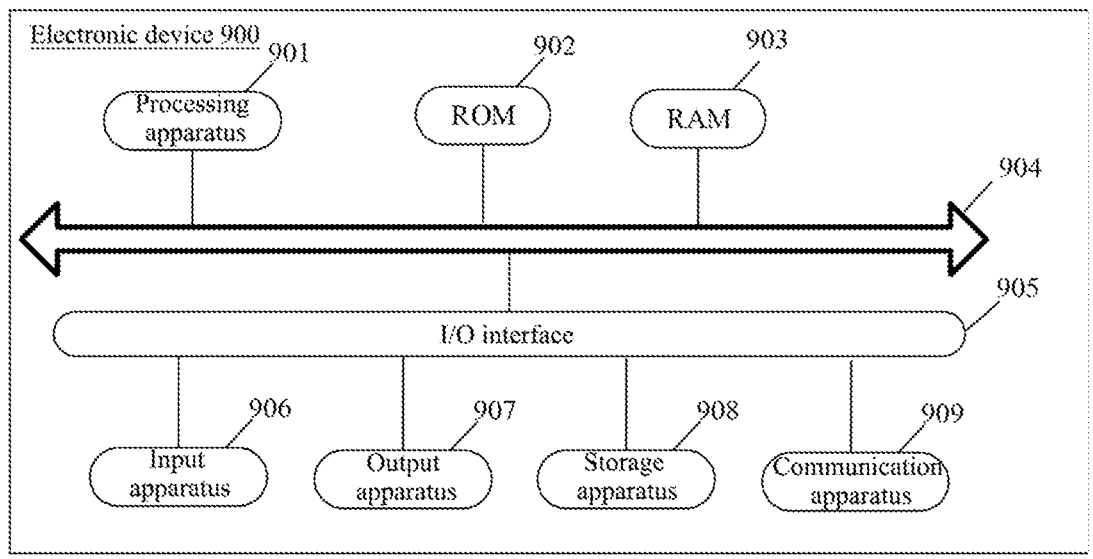
FIG. 8 exemplarily illustrates a hardware structure diagram of an electronic device provided by an embodiment of the present disclosure.

Further, FIG. 8 exemplarily illustrates a hardware structure diagram of an electronic device 900 provided by an embodiment of the present disclosure, the electronic device 900 may be a terminal device. The terminal device may include, but is not limited to, a mobile terminal, such as a mobile phone, a notebook computer, a digital broadcast receiver, a personal digital assistant (PDA), a portable android device (PAD), a portable media player (PMP), an in-vehicle terminal (for example, an in-vehicle navigation terminal), and a fixed terminal, such as a digital television (TV), a desktop computer. The electronic device shown in FIG. 8 is merely an example, and should not bring about any limitation to functions and usage scopes of the embodiments of the present disclosure.

As shown in FIG. 8, the electronic device 900 may include a processing apparatus (for example, a central processor, a graphic processor, etc.) 901, which may perform various appropriate actions and processing according to a program stored in a read only memory (ROM) 902 or a program loaded from a storage apparatus 908 to a random access memory (RAM) 903. In the RAM 903, various programs and data required for operations of the electronic device 900 may also be stored. The processing apparatus 901, the ROM 902, and the RAM 903 are connected to each other by a bus 904. An input/output (I/O) interface 905 is also connected to the bus 904.

Generally, the following apparatuses may be connected to the I/O interface 905: an input apparatus 906, which includes, for example, a touch screen, a touch pad, a keyboard, a mouse, a camera, a microphone, an accelerometer, a gyroscope, etc.; an output apparatus 907, which includes, for example, a liquid crystal display (LCD), a speaker, a vibrator, etc.; a storage apparatus 908, which includes, for example, a magnetic tape, a hard disk, etc.; and a communication apparatus 909. The communication apparatus 909 may allow the electronic device 900 to communicate with other devices in a wireless or wired way, to exchange data. Although FIG. 8 shows an electronic device 900 having various apparatuses, it should be understood that it is not required to implement or have all of the shown apparatuses. It is alternatively possible to implement or have more or fewer apparatuses.

In particular, according to an embodiment of the present disclosure, processes described above with reference to the flowcharts may be implemented as a computer software program. For example, an embodiment of the present disclosure includes a computer program product, which includes a computer program carried on a computer readable medium, and the computer program contains program codes used for executing the method shown in the flowcharts. In such embodiment, the computer program may be downloaded and installed from a network via the communication apparatus 909, or installed from the storage apparatus 908, or installed from the ROM 902. When the computer program is executed by the processing apparatus 901, the above functions defined in the method of the embodiments of the present disclosure are performed.

It should be noted that the above computer readable medium in the present disclosure may be a computer readable signal medium, or a computer readable storage medium, or any combination of both. The computer readable storage medium may be, for example, but is not limited to, an electrical, magnetic, optical, electromagnetic, infrared, or semiconductor system, apparatus, or components, or any combination thereof. More specific examples of the computer readable storage medium may include, but is not limited to: an electrical connection with one or more wires, a portable computer disk, a hard disk, a random access memory (RAM), a read only memory (ROM), an erasable programmable read only memory (EPROM or a flash memory), an optical fiber, a portable compact disc read only memory (CD-ROM), an optical storage component, a magnetic storage component, or any suitable combination thereof. In the present disclosure, a computer readable storage medium may be any tangible medium that contains or stores a program, and the program may be used by or in combination with an instruction execution system, apparatus, or component. In the present disclosure, a computer readable signal medium may include a data signal propagated in a baseband or as a part of a carrier, and the data signal carries computer readable program codes. Such propagated data signal may take various forms, including but not limited to an electromagnetic signal, an optical signal, or any suitable combination thereof. The computer readable signal medium may also be any computer readable medium other than the computer readable storage medium, and the computer readable signal medium may send, propagate, or transmit a program which is used by or in combination with the instruction execution system, apparatus, or component. The program codes contained in the computer readable medium may be transmitted by any suitable medium, including but is not limited to: a wire, an optical cable, RF (Radio Frequency), etc., or any suitable combination thereof.

The above computer readable medium may be included in the above electronic device; or may exist alone without being assembled into the electronic device.

The above computer readable medium carries one or more programs that, when executed by the electronic device, cause the electronic device to perform the method shown in the above embodiments.

The computer program codes used to perform operations of the present disclosure may be written in one or more programming languages or a combination thereof, the above programming languages include object-oriented programming languages, such as Java, Smalltalk, C++, and also include conventional procedural programming languages, such as "C" language or similar programming language. The program codes may be executed entirely on a user's computer, executed partly on a user's computer, executed as an independent software package, executed partly on a user's computer and partly on a remote computer, or executed entirely on a remote computer or a server. In the case of a remote computer involved, the remote computer may be connected to the user's computer through any kind of networks, which includes a local area network (LAN) or a wide area network (WAN), or, the remote computer may be connected to an external computer (for example, be connected to the external computer via the Internet by utilizing an internet service provider).

Flowcharts and block diagrams in the accompanying drawings illustrate architectures, functions, and operations of possible implementations of systems, methods and computer program products according to various embodiments of the present disclosure. In this regard, each block in the flowcharts or block diagrams may represent a module, a program segment, or a part of codes, and the module, the program segment, or the part of codes contains one or more executable instructions used for realizing specified logic functions. It should also be noted that in some alternative implementations, functions marked in the block may also occur in an order different from the order marked in the accompanying drawings. For example, two blocks shown in succession may actually be performed substantially in parallel, and they may sometimes be performed in a reverse order, depending on the functions involved. It should also be noted that each block in the block diagrams and/or the flowcharts as well as combinations of blocks in the block diagrams and/or the flowcharts may be implemented by a dedicated hardware-based system that performs specified functions or operations, or may be implemented by a combination of dedicated hardware and computer instructions.

Units involved in the embodiments described in the present disclosure may be implemented in a software or hardware manner. A name of a unit does not constitute a limitation on the unit itself under certain circumstances, for example, a first acquiring unit may also be described as "a unit for acquiring at least two internet protocol addresses".

The functions herein described above may be performed at least in part by one or more hardware logic assemblies. For example, without limitation, exemplary types of hardware logic assemblies that may be used include: a field programmable gate array (FPGA), an application specific integrated circuit (ASIC), an application specific standard product (ASSP), a system on chip (SOC), a complex programmable logic device (CPLD), etc.

In the context of the present disclosure, a machine readable medium may be a tangible medium that may contain or store a program to be used by or in combination with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination thereof. More specific examples of the machine readable storage medium would include an electrical connection based on one or more wires, a portable computer disk, a hard disk, a random access memory (RAM), a read only memory (ROM), an erasable programmable read only memory (EPROM or a flash memory), an optical fiber, a portable compact disc read only memory (CD-ROM), an optical storage device, a magnetic storage device, or any suitable combination thereof.

An embodiment of the present disclosure further a computer program, the computer program is used for implementing the adaptive playback method for video or the method for generating the code rate prediction model as described above.

An embodiment of the present disclosure further provides a computer-readable storage medium, where the computer readable storage medium stores computer executable instructions, and when a processor executes the computer-executable instructions, a computing device is caused to implement the adaptive playback method for video or the method for generating the code rate prediction model as described above.

The embodiment of the present disclosure further provides an adaptive playback system for video, which may include a terminal device and a server.

In a first example of a first aspect, an embodiment of the present disclosure provides an adaptive playback method for video, including:
 receiving a playback instruction for a target video; and
 playing the target video according to a first code rate in response to the playback instruction;
 where the first code rate is determined by the following steps:
 predicting by using a network speed prediction algorithm to obtain a first network speed;
 acquiring a code rate prediction model corresponding to the network speed prediction algorithm, where the code rate prediction model is used for representing, under a historical performance parameter before switching to the network speed prediction algorithm, a mapping relationship between a network speed predicted by the network speed prediction algorithm and a code rate; and determining the first code rate corresponding to the first network speed through the code rate prediction model.

Based on the first example of the first aspect, in a second example of the first aspect, the playing the target video according to a first code rate includes:

determining a second code rate closest to the first code rate from at least two preset code rates; and playing the target video according to the second code rate.

Based on the second example of the first aspect, in a third example of the first aspect, the playing the target video according to the second code rate includes:

if the target video has been started to load, and a current code rate at which the target video is loaded is the second code rate, playing the target video after the target video is loaded at the second code rate.

Based on the second example of the first aspect, in a fourth example of the first aspect, the playing the target video according to the second code rate includes:

if the target video has been started to load, and a current code rate at which the target video is loaded is different from the second code rate, determining total duration of loading the target video at the second code rate and remaining duration of loading the target video at the current code rate; and if the remaining duration is less than or equal to the total duration, playing the target video after the target video is loaded at the current code rate.

Based on the second example of the first aspect, in a fifth example of the first aspect, the playing the target video according to the second code rate includes:

if the target video has been started to load, and a current code rate at which the target video is loaded is different from the second code rate, determining total duration of loading the target video at the second code rate and remaining duration of loading the target video at the current code rate;

if the remaining duration is greater than the total duration, loading remaining part of the target video at the second code rate; and playing the target video after the target video is loaded at the second code rate.

In a first example of a second aspect, a method for generating a code rate prediction model is provided, including:

acquiring at least two video playback records, where the video playback records include a second code rate when a video is played, a second network speed when the video is played predicted by using a network speed prediction algorithm, and at least one playback parameter of the video;

for at least one network speed interval, determining a performance parameter corresponding to the second code rate under each network speed interval according to a playback parameter in at least one target video playback record, where the second network speed in the target video playback record is within the network speed interval;

determining, according to the performance parameter corresponding to the second code rate under each network speed interval, a second code rate corresponding to each network speed interval under a historical performance parameter before switching to the network speed prediction algorithm; and determining a code rate prediction model corresponding to the network speed prediction algorithm according to the at least one network speed interval and the second code rate respectively corresponding to the at least one network speed interval, where the code rate prediction model is used for representing a mapping relationship between a network speed predicted by the network speed prediction algorithm and a code rate under the historical performance parameter.

Based on the first example of the second aspect, in a second example of the second aspect, the determining a code rate prediction model corresponding to the network speed prediction algorithm according to the at least one network speed interval and the second code rate respectively corresponding to the at least one network speed interval includes:

performing polynomial fitting according to the at least one network speed interval and the second code rate respectively corresponding to the at least one network speed interval, and taking a obtained polynomial function as the code rate prediction model corresponding to the network speed prediction algorithm.

In a first example of a third aspect, a terminal device is provide, including: a playback instruction receiving module, configured to receive a playback instruction for a target video; and a target video playback module, configured to play the target video according to a first code rate in response to the playback instruction;

where the first code rate is determined by the following modules:

a network speed prediction module, configured to predict by using a network speed prediction algorithm to obtain a first network speed;

a code rate prediction model acquisition module, configured to acquire a code rate prediction model corresponding to the network speed prediction algorithm, where the code rate prediction model is used for representing, under a historical performance parameter before switching to the network speed prediction algorithm, a mapping relationship between a network speed predicted by the network speed prediction algorithm and a code rate; and a first code rate determination module, configured to determine the first code rate corresponding to the first network speed through the code rate prediction model.

Based on the first example of the third aspect, in a second example of the third aspect, the target video playback module is further configured to:

determine a second code rate closest to the first code rate from at least two preset code rates; and play the target video according to the second code rate.

Based on the second example of the third aspect, in a third example of the third aspect, the target video playback module is further configured to:

if the target video has been started to load, and a current code rate at which the target video is loaded is the second code rate, play the target video after the target video is loaded at the second code rate.

Based on the second example of the third aspect, in a fourth example of the third aspect, the target video playback module is further configured to:

if the target video has been started to load, and a current code rate at which the target video is loaded is different from the second code rate, determine total duration of loading the target video at the second code rate and remaining duration of loading the target video at the current code rate; and if the remaining duration is less than or equal to the total duration, play the target video after the target video is loaded at the current code rate.

Based on the second example of the third aspect, in the fifth example of the third aspect, the target video playback module is further configured to:

if the target video has been started to load, and a current code rate at which the target video is loaded is different from the second code rate, determine total duration of loading the target video at the second code rate and remaining duration of loading the target video at the current code rate;

if the remaining duration is greater than the total duration, load remaining part of the target video at the second code rate; and play the target video after the target video is loaded at the second code rate.

In a first example of a fourth aspect, a server is provided, including:

a video playback record acquisition module, configured to acquire at least two video playback records, where the video playback records include a second code rate when a video is played, a second network speed when the video is played predicted by using a network speed prediction algorithm, and at least one playback parameter of the video;

a performance parameter determination module, configured to, for at least one network speed interval, determine a performance parameter corresponding to the second code rate under each network speed interval according to a playback parameter in at least one target video playback record, where the second network speed in the target video playback record is within the network speed interval;

a second code rate determination module, configured to determine, according to the performance parameter corresponding to the second code rate under each network speed interval, a second code rate corresponding to each network speed interval under a historical performance parameter before switching to the network speed prediction algorithm; and a code rate prediction model determination module, configured to determine a code rate prediction model corresponding to the network speed prediction algorithm according to the at least one network speed interval and the second code rate respectively corresponding to the at least one network speed interval, where the code rate prediction model is used for representing a mapping relationship between a network speed predicted by the network speed prediction algorithm and a code rate under the historical performance parameter.

Based on the first example of the fourth aspect, in a second example of the fourth aspect, the code rate prediction model determination module is further configured to:

perform polynomial fitting according to the at least one network speed interval and the second code rate respectively corresponding to the at least one network speed interval, and take a obtained polynomial function as the code rate prediction model corresponding to the network speed prediction algorithm.

In a fifth aspect, one or more embodiments of the present disclosure provide a terminal device, including: at least one processor and a memory;

the memory stores computer-executable instructions; and
the at least one processor executes the computer-executable instructions stored in the memory, so that the terminal device implements the method according to any one of the first aspects.

In a sixth aspect, one or more embodiments of the present disclosure provide a server, including at least one processor and a memory;

the memory stores computer-executable instructions; and
the at least one processor executes the computer-executable instructions stored in the memory, so that the server implements the method according to any one of the second aspects.

In a seventh aspect, one or more embodiments of the present disclosure provide an adaptive playback system for video, including: the terminal device according to the third aspect or the fifth aspect, and the server according to the fourth aspect or the sixth aspect.

In an eighth aspect, one or more embodiments of the present disclosure provide a computer-readable storage medium, where the computer readable storage medium stores computer executable instructions, and when a processor executes the computer executable instructions, the method according to the first aspect or the second aspect is implemented.

In a ninth aspect, one or more embodiments of the present disclosure provide a computer program, the computer program is used for implementing the method according to the first aspect or the second aspect.

In a tenth aspect, a computer program product includes a computer program which, when executed by a processor, implements the method according to the first aspect or the second aspect.

The above description is merely illustration of preferred embodiments of the present disclosure and applied technical principles. Those skilled in the art should understand that the disclosed scope involved in the present disclosure is not limited to technical solutions formed by a specific combination of the above technical features, and should also cover other technical solutions formed by any combination of the above technical features or equivalent features thereof without departing from the above disclosed concept, for example, a technical solution formed by replacing the above features with technical features having similar functions as the above features and being disclosed in the present disclosure (without limitation).

In addition, although operations are depicted in a specific order, this should not be understood as requiring these operations to be performed in the specific order as shown or in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments may also be implemented in combination in a single embodiment. Conversely, various features described in the context of a single embodiment may also be implemented in multiple embodiments individually or in any suitable subcombination.

Although the present subject matter has been described in language specific to structural features and/or method logical actions, it should be understood that the subject matter defined in the appended claims is not necessarily limited to the specific features or actions described above. Conversely, the specific features and actions described above are merely example forms for implementing the claims.

What is claimed is:

1. An adaptive playback method for video, comprising:
receiving a playback instruction for a target video; and playing the target video according to a first code rate in response to the playback instruction;
wherein the first code rate is determined by the following steps:
based on switching from a second network speed prediction algorithm to a first network speed prediction algorithm, predicting by using the first network speed prediction algorithm to obtain a first network speed;
acquiring a code rate prediction model corresponding to the first network speed prediction algorithm, wherein the code rate prediction model corresponding to the first network speed prediction algorithm is used for representing, under a historical performance parameter before switching to the first network speed prediction algorithm, a mapping relationship between a network speed predicted by the first network speed prediction algorithm and a code rate, wherein the first network speed prediction algorithm is different from the second network speed prediction algorithm, and the code rate prediction model corresponding to the first network speed prediction algorithm is different from a code rate prediction model corresponding to the second network speed prediction algorithm; and
determining the first code rate corresponding to the first network speed through the code rate prediction model corresponding to the first network speed prediction algorithm.

2. The method according to claim 1, wherein the playing the target video according to a first code rate comprises:
determining a second code rate closest to the first code rate from at least two preset code rates; and
playing the target video according to the second code rate.

3. The method according to claim 2, wherein the playing the target video according to the second code rate comprises:
if the target video has been started to load, and a current code rate at which the target video is loaded is the second code rate, playing the target video after the target video is loaded at the second code rate.

4. The method according to claim 2, wherein the playing the target video according to the second code rate comprises:
if the target video has been started to load, and a current code rate at which the target video is loaded is different from the second code rate, determining a total duration of loading the target video at the second code rate and a remaining duration of loading the target video at the current code rate; and
if the remaining duration is less than or equal to the total duration, playing the target video after the target video is loaded at the current code rate.

5. The method according to claim 2, wherein the playing the target video according to the second code rate comprises:
if the target video has been started to load, and a current code rate at which the target video is loaded is different from the second code rate, determining a total duration of loading the target video at the second code rate and a remaining duration of loading the target video at the current code rate;
if the remaining duration is greater than the total duration, loading a remaining part of the target video at the second code rate; and
playing the target video after the target video is loaded at the second code rate.

6. A method for generating a code rate prediction model, comprising:
acquiring at least two video playback records, wherein the at least two video playback records comprise a second code rate when a video is played, a second network speed when the video is played predicted by using a network speed prediction algorithm, and at least one playback parameter of the video;
for at least one network speed interval, determining a performance parameter corresponding to the second code rate under each network speed interval of the at least one network speed interval according to a playback parameter in at least one video playback record of the at least two video playback records, wherein the second network speed in the at least one video playback record is within the at least one network speed interval;
determining, according to the performance parameter corresponding to the second code rate under each network speed interval of the at least one network speed interval, a second code rate corresponding to each network speed interval of the at least one network speed interval under a historical performance parameter before switching to the network speed prediction algorithm; and
determining the code rate prediction model corresponding to the network speed prediction algorithm according to the at least one network speed interval and the second code rate respectively corresponding to the at least one network speed interval, wherein the code rate prediction model is used for representing a mapping relationship between a network speed predicted by the network speed prediction algorithm and a code rate under the historical performance parameter.

7. The method according to claim 6, wherein the determining the code rate prediction model corresponding to the network speed prediction algorithm according to the at least one network speed interval and the second code rate respectively corresponding to the at least one network speed interval comprises:
performing polynomial fitting according to the at least one network speed interval and the second code rate respectively corresponding to the at least one network speed interval, and taking an obtained polynomial function as the code rate prediction model corresponding to the network speed prediction algorithm.

8. A terminal device, comprising: at least one processor and a memory; wherein
the memory stores computer-executable instructions, and
the at least one processor executes the computer-executable instructions stored in the memory, and the terminal device is caused to:
receive a playback instruction for a target video; and
play the target video according to a first code rate in response to the playback instruction;
wherein the first code rate is determined by the following steps:
based on switching from a second network speed prediction algorithm to a first network speed prediction algorithm, predicting by using the first network speed prediction algorithm to obtain a first network speed;
acquiring a code rate prediction model corresponding to the first network speed prediction algorithm, wherein the code rate prediction model corresponding to the first network speed prediction algorithm is used for representing, under a historical performance parameter before switching to the first network speed prediction algorithm, a mapping relationship between a network speed predicted by the first network speed prediction algorithm and a code rate, wherein the first network speed prediction algorithm is different from the second network speed prediction algorithm, and the code rate prediction model corresponding to the first network speed prediction algorithm is different from a code rate prediction model corresponding to the second network speed prediction algorithm; and determining the first code rate corresponding to the first network speed through the code rate prediction model corresponding to the first network speed prediction algorithm.

9. A server, comprising: at least one processor and a memory; wherein the memory stores computer-executable instructions; and the at least one processor executes the computer-executable instructions stored in the memory, so that the server implements the method according to claim 6.

10. An adaptive playback system for video, comprising: the terminal device according to claim 8, and a server, wherein the server comprises at least one processor and a memory, the memory stores computer-executable instructions; and the at least one processor executes the computer-executable instructions stored in the memory, and the server is caused to:

acquire at least two video playback records, wherein the at least two video playback records comprise a second code rate when a video is played, a second network speed when the video is played predicted by using a network speed prediction algorithm, and at least one playback parameter of the video;

for at least one network speed interval, determine a performance parameter corresponding to the second code rate under each network speed interval of the at least one network speed interval according to a playback parameter in at least one video playback record of the at least two video playback records, wherein the second network speed in the at least one video playback record is within the at least one network speed interval;

determine, according to the performance parameter corresponding to the second code rate under each network speed interval of the at least one network speed interval, a second code rate corresponding to each network speed interval of the at least one network speed interval under a historical performance parameter before switching to the network speed prediction algorithm; and determine a code rate prediction model corresponding to the network speed prediction algorithm according to the at least one network speed interval and the second code rate respectively corresponding to the at least one network speed interval, wherein the code rate prediction model is used for representing a mapping relationship between a network speed predicted by the network speed prediction algorithm and a code rate under the historical performance parameter.

11. A non-transitory computer-readable storage medium, wherein the computer-readable storage medium stores computer executable instructions, and when a processor executes the computer executable instructions, a computing device is caused to implement the method according to claim 1.

12. The terminal device according to claim 8, wherein the terminal device is caused to:

determine a second code rate closest to the first code rate from at least two preset code rates; and play the target video according to the second code rate.

13. The terminal device according to claim 12, wherein the terminal device is caused to:

if the target video has been started to load, and a current code rate at which the target video is loaded is the second code rate, play the target video after the target video is loaded at the second code rate.

14. The terminal device according to claim 12, wherein the terminal device is caused to:

if the target video has been started to load, and a current code rate at which the target video is loaded is different from the second code rate, determine a total duration of loading the target video at the second code rate and a remaining duration of loading the target video at the current code rate; and if the remaining duration is less than or equal to the total duration, play the target video after the target video is loaded at the current code rate.

15. The terminal device according to claim 12, wherein the terminal device is caused to:

if the target video has been started to load, and a current code rate at which the target video is loaded is different from the second code rate, determine a total duration of loading the target video at the second code rate and a remaining duration of loading the target video at the current code rate;

if the remaining duration is greater than the total duration, load a remaining part of the target video at the second code rate; and play the target video after the target video is loaded at the second code rate.

16. The server according to claim 9, wherein the server is caused to:

perform polynomial fitting according to the at least one network speed interval and the second code rate respectively corresponding to the at least one network speed interval, and take an obtained polynomial function as the code rate prediction model corresponding to the first network speed prediction algorithm.

17. A non-transitory computer-readable storage medium, wherein the computer-readable storage medium stores computer executable instructions, and when a processor executes the computer executable instructions, a computing device is caused to implement the method according to claim 6.

* * * * *